United States Patent [19]

Husky et al.

[11] Patent Number: 5,711,064
[45] Date of Patent: Jan. 27, 1998

[54] HEAD TO TAPE ALIGNMENT WITHOUT TAPE GUIDE

[75] Inventors: Daniel Stewart Husky; John Alexander Koski; Jay Eunsuk Lee, all of Tucson, Ariz.

[73] Assignee: International Business Machines Corporation, Armonk, N.Y.

[21] Appl. No.: 682,213

[22] Filed: Jul. 17, 1996

Related U.S. Application Data

[62] Division of Ser. No. 451,816, May 26, 1995, abandoned.

[51] Int. Cl.[6] ........................................... G11B 5/42
[52] U.S. Cl. .................. 29/603.06; 360/75; 360/104
[58] Field of Search ..................... 29/603.06, 603.05, 29/603.04; 360/104–109, 75

[56] References Cited

U.S. PATENT DOCUMENTS 4,854,036  8/1989  DiGregorio ................. 29/603.06 X Primary Examiner—Carl E. Hall
Attorney, Agent, or Firm—R. M. Sullivan

[57] ABSTRACT

A head assembly forming a field replaceable unit (FRU) is assembled and adjusted such that head-to-tape path alignments are accurately made completely independently of an associate tape drive device. The head assembly includes an aluminum base having a magnet and shield assembly attached to a back thereof. A head os attached to a rigid beam with a voice coil formed thereon and the head and beam are flexibly attached to the base with the voice coil functionally located for movement within the magnet assembly. A flag on the beam is sensed by an optical sensor attached to the base such that a horizontal position of the head can be sensed. An azimuth arm is attached to the front of the base having an azimuth and penetration datum affixed thereto. The azimuth arm is moved horizontally in relation to a mount plate of a data cartridge for azimuth adjustment. The penetration datum is adjusted for the penetration alignment relative to the mount plate.

9 Claims, 9 Drawing Sheets

HEAD TO TAPE ALIGNMENT WITHOUT TAPE GUIDE

This application is a divisional application of a commonly-assigned patent application, Ser. No. 08/451,816, filed May 26, 1995, now abandoned.

FIELD OF THE INVENTION

The present invention relates generally to tape drives, and more particularly, to a tape head assembly providing head-to-tape path alignment independent of the tape device.

BACKGROUND OF THE INVENTION

Data processing systems, in conjunction with processing data, typically are required to store large amounts of data (or records), which data can be efficiently accessed, modified, and re-stored. While several different mediums of data storage are typically provided within a data processing system (electronic memory, direct access storage devices (DASD), and magnetic tape), magnetic tape has an advantage of reduced cost for very large data storage capabilities, for example, gigabytes of data storage per tape. Tape storage is often used for back-up purposes, that is, data stored on one storage medium is reproduced on magnetic tape for safekeeping. Having a back-up data copy is mandatory for many businesses as data loss could be catastrophic to the business. Large volumes of back-up data, for example, terabytes of data, are generally stored in a tape library, using a robotic mechanism to select a tape for access to data thereon or for writing back-up data thereto. Increasing the data capacity that can be stored to tape reduces the cost of backing up data and improves library efficiency.

In the information storage industry, increases in tape data capacities have been achieved, in part, by increasing tape lengths stored within a cartridge or reel by producing thinner tape substrates. Additional increases in data capacity are made possible by various data compression techniques, for example, Improved Data Recording Capability (IDRC) by International Business Machines, Company, or Lempel-Ziv data compression by Stac Electronics, Inc. Data compression techniques can increase data density by two to five times over non-compressed data.

Advances in magnetic tape media and tape head technologies have generated further increases in data capacity by increasing both a number of tracks on a magnetic tape (by narrowing a width of each track) and the number of read/write elements on the tape head. An eighteen-track tape for data storage has been a standard for many years. More recently, an IBM 3490-E magnetic tape subsystem for 12.7 mm (½ inch) wide tape employs a head element with thirty-six read/write elements and has a tape capacity of 800 megabytes (increasing to two or more gigabytes with data compression). The 3490-E magnetic tape subsystem performs bi-directional linear recording (as opposed to helical scan recording).

A number of tape rewinds is reduced, and performance improved accordingly, by interleaving sets of head elements. In an interleaved head, element pairs having a read-element/write-element configuration (when viewed towards the face of the head) alternate with element pairs having an opposite write-element/read-element configuration, each pair of elements being associated with one track on the tape. When the tape travels in a first direction, the element pairs having one configuration access the corresponding tracks (such as the even numbered tracks) in a read-after-write manner. Conversely, when the tape travels in an opposite direction, those element pairs having the other configuration access the other corresponding tracks (such as the odd numbered tracks), also in a read-after-write manner. Further enhancing performance with such a large number of tracks requires an equally large number of closely spaced elements. The 3490-E tape head is such a head with a magneto-resistive transducer formed through thin film deposition techniques.

Historically, the number of tracks that could be established on the tape media has been limited by a number of corresponding elements that could be fabricated on a tape head. As a result, tape drives have been designed to process a tape using a head having fewer sets of read/write elements than a number of tracks on the tape. The tracks are divided into groups, each group containing a same number of tracks as there are read/write element pairs in the head. Accessing all the groups requires indexing the head transversely relative to the tape path, such as with a stepper motor or voice coil driven springs, into a number of discrete positions corresponding to the number of groups of tracks. A head having eight read/write pairs can accommodate a tape having twenty-four tracks if the tracks are divided into three groups of eight tracks each and the head has three index positions. A distance the head travels between index positions is minimized by interleaving the groups. For example, each of the three groups containing eight tracks (consecutively numbered 0-23) results in tracks 0, 3, 6, . . . , and 21 being in the first group and accessible by the head being indexed to position zero. Similarly, tracks 1, 4, 7, . . . , and 22 are in the second group, accessible in index position one, while tracks 2, 5, 8, . . . , and 23 are in the third group, accessible in index position 2.

Despite advances in data capacity, still further increases are desired, such as would be possible with a 12.7 mm wide tape having 64 or even 128 tracks. However, even when a head is indexed, there is a practical limit to the ability of a multi-track head to accurately and reliably record data to and read data from a tape having such a large number of very narrow tracks. Problems can be caused by track mis-registrations, such as tape edge variations, environmental thermal expansion and contraction and inaccuracies in the path the tape follows in a drive, as well as by inaccuracies in the formatting of tracks on the tape itself. Even a minute "wobble" in the tape can result in significant signal degradation, such as crosstalk and dropout, if a 12.7 mm tape has 128 tracks, each with a width of about eighty microns.

Using fixed heads, as in the past, made it easier to deal with track mis-registrations, etc. Now, however, not only are the tracks narrower, but the head is servo-controlled. Thus the head must appear fixed in terms of a home position, while providing excellent accuracy while servoing across track groups. Hence, very accurate head-to-tape path adjustments are required. These adjustments include track registration, penetration, yaw and azimuth. If any of these fine adjustments falls out of tolerance, or if the head itself fails, then the tape drive itself needs to be accessed to either make the adjustment, or to replace the head or field replaceable head unit (FRU) and re-adjust after installing the FRU. Such adjustment and/or replacement is costly and timely having to be performed on site or requiring shipping the entire tape device. In the case where the tape path and guides are fully contained within the tape cartridge, alignment demands may not be achievable.

Accordingly it is desired to provide a method and apparatus for accurately aligning a servo-controlled head to a tape path in a field replaceable unit (FRU), independent of the actual tape device.

SUMMARY OF THE INVENTION

An object of the present invention is to provide an improved head assembly for a magnetic tape device.

Another object of the present invention is to provide a head assembly that is a field replaceable unit (FRU) wherein the head assembly can be accurately and finally adjusted for tape head to tape path alignment independently of a tape device.

According to a first embodiment of the present invention, a method for assembling a field replaceable unit (FRU) including a tape head, is provided. The FRU is adjusted for proper alignment to a tape path in a tape device, wherein the tape path is formed within a tape cartridge. The adjustment is made during FRU assembly and is independent of the tape path. The adjustment is enabled by use of a accurately machined mount plate within tape cartridge which defines the tape path location. The mount plate has a plurality of tape data points corresponding to datums on the FRU. Critical tape head alignments include azimuth angle and wrap angle. A magnet-housing-shield is attached securely a back side of an actuator base (hereinafter simply referred to as a base), and a head assembly is then flexibly attached to the back of the base in cooperation with the magnet-housing-shield, the head assembly including a tape head attached to a rigid beam, a voice coil attached to the rigid beam, and a sensor flag (attached to or machined into the rigid beam). An optical sensor is securely connected to the back of the base such that the flag is within a predetermined position of the optical sensor. An azimuth arm is then loosely attached to a front of the base, the azimuth arm having an azimuth datum fixed thereto (for example, a point contact type datum pin) and an adjustable penetration datum attached thereto. The azimuth arm is movable in a horizontal direction and fixed in a vertical direction. An azimuth angle of the tape head is adjusted relative to the tape path by moving horizontally the azimuth arm such that the azimuth datum is in predetermined position relative to the tape head. A similar azimuth datum is fixedly attached to the base. The angular relationship between the two azimuth datums and the tape head defines the azimuth angle. The penetration datum is aligned by moving the penetration datum substantially perpendicular to the azimuth arm such that the mount plate and the penetration datum are in a predetermined relationship.

In another embodiment of the present invention, a magnetic tape head assembly for processing data to a magnetic tape, wherein the magnetic tape is contained within a tape cartridge such that a tape path is defined within the tape cartridge. Further, the tape path is defined relative to a mount plate of the tape cartridge, the mount plate having a plurality of data points for interacting with the magnetic tape head assembly to define tape head to tape path alignment. The magnetic tape head assembly forms a field replaceable unit (FRU) that is critically aligned for penetration and azimuth angle independent of a tape device. The FRU includes a base member having first and second datums for defining a tape head to tape path centering and azimuth angle. A magnet assembly is attached to the base. A head unit includes the tape head and head cables attached to a rigid beam member having a coil and sensor flag integral thereto, the head unit being attached to the base member via flexures such that the coil and magnet interact to index the tape head. The rigid beam includes a feature to limit maximum displacement (for example, a crash stop) of the beam relative to the base plate. A sensor is connected to the base for sensing a position of the flag for controlling the position of the tape head. An azimuth arm is slidably coupled to the base having third and fourth datums attached thereto, the third datum interacts with the mount plate to finally align the azimuth angle while the fourth datum interacts with the mount plate to align the penetration.

The foregoing and other objects, features, and advantages of the invention will be apparent from the following more particular description of a preferred embodiment of the invention, as illustrated in the accompanying drawing.

DETAILED DESCRIPTION

Figure 1:
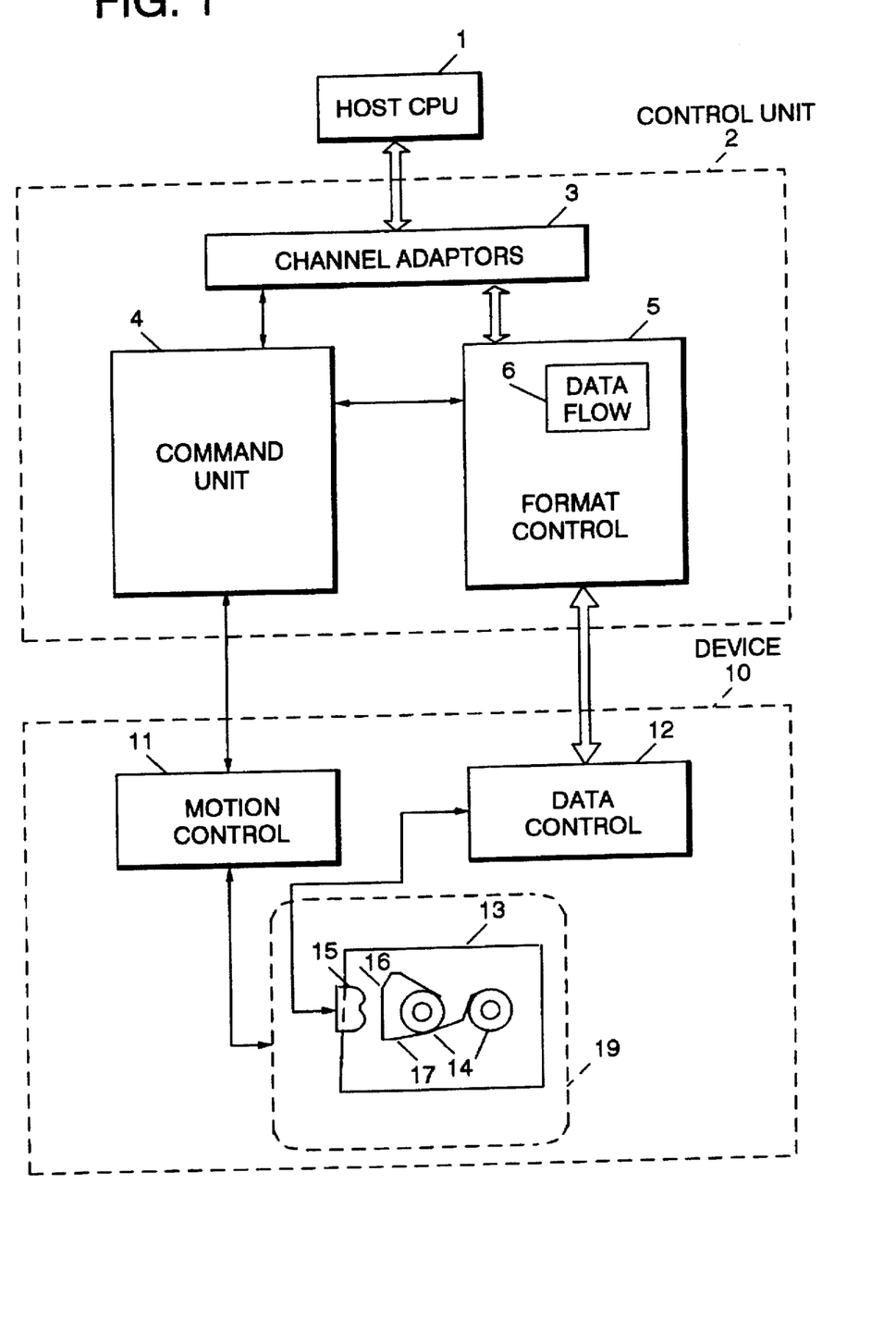
FIG. 1 is a schematic block diagram of a tape system embodying the invention.

Referring more particularly to the drawing, like numerals denote like features and structural elements in the various figures. The invention will be described as embodied in a magnetic tape drive for use in a data processing environment. Turning now to FIG. 1, a data processing system is controlled by at least one host central processing unit (CPU) 1, such as an IBM System/370 or IBM Enterprise Systems/9000 (ES/9000), to store, retrieve, and manipulate data. The data processing system includes one or more storage subsystems, including at least one tape system. The tape system further includes at least one control unit 2 and at least one magnetic tape recording or playback device 10. The control unit 2 accepts commands and data from the CPU 1 via one or more channel adaptors 3, and controls the device(s) 10 accordingly. The control unit 2 and the device 10 may be physically separate or packaged together. Still further, the channel adaptors 3 can be replaced by the well known small computer standard interface (SCSI).

The device 10 includes a motion control 11 for controlling the handling of magnetic tape media, a data control 12 including read and write circuits to operate a magnetic transducing head 15 (hereinafter referred to as tape head 15), and a tape path 16 (including a tape cartridge 13 having tape take-up/supply reels 14 therein) for transporting a magnetic tape 17 past the head 15 for writing data to and reading data from the magnetic tape 17. The data control 12 is connected to a format control 5 in the control unit 2, which is in turn connected to the channel adaptors 3. Format control 5 further includes a data flow 6 which, among other things, detects End of Block (EOB) marks located on the magnetic tape 17.

The motion control 11 is connected to a command unit 4 in the control unit 2, which command unit 4 is also connected to the channel adaptors 3. The command unit 4 accepts commands from the CPU 1 via the channel adaptors 3 and controls the mechanical operation of the device 10. The command unit 4 further controls the flow of data between the channel adaptors 3 and the magnetic tape 17 via format control 5 and the data control 12.

Figure 2:
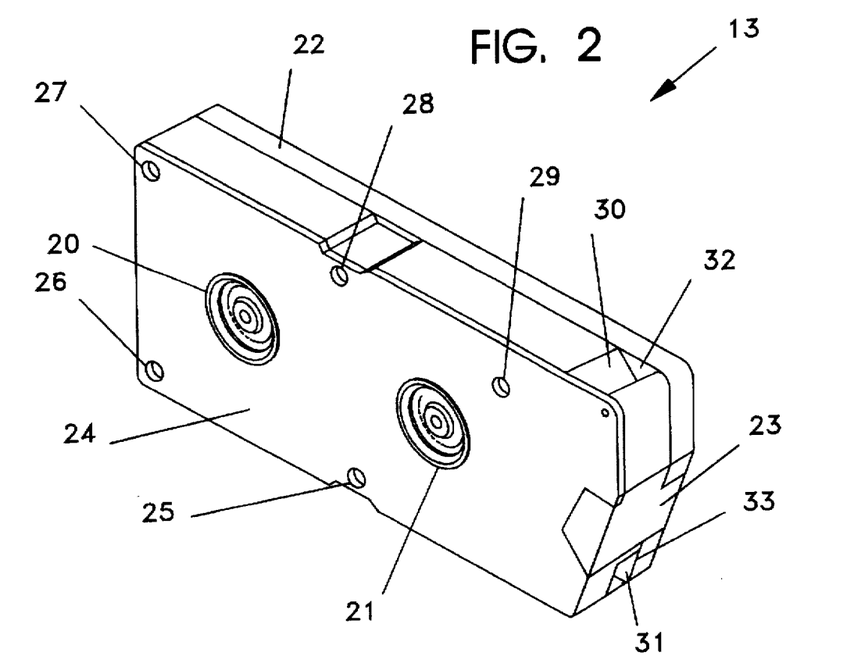
FIG. 2 is a perspective view of a magnetic tape cartridge having a pivoting door in a closed position.

FIG. 2 depicts the tape cartridge 13 in greater detail. The Tape cartridge 13 includes a box like housing formed by a mount plate 22 and a cover 24. The cover 24 is secured to the mount plate 22 by screws inserted through a set of holes 25-29. The cover 24 also includes two wall recesses represented by arrows 30 and 31. Wall recesses 30 and 31 expose two mount portions 32 and 33, respectively, of the inner surface of the mount plate 22. The mount plate is machined to a high degree of accuracy, i.e., typically within a tolerance of several mils, for providing accurate data points at the mount portions 32 and 33 for properly aligning the tape 17 to the tape head 15. A pivoting access door 23 is hinged between mount plate 22 and the cover 24 and is shown in the closed position.

Figure 3:
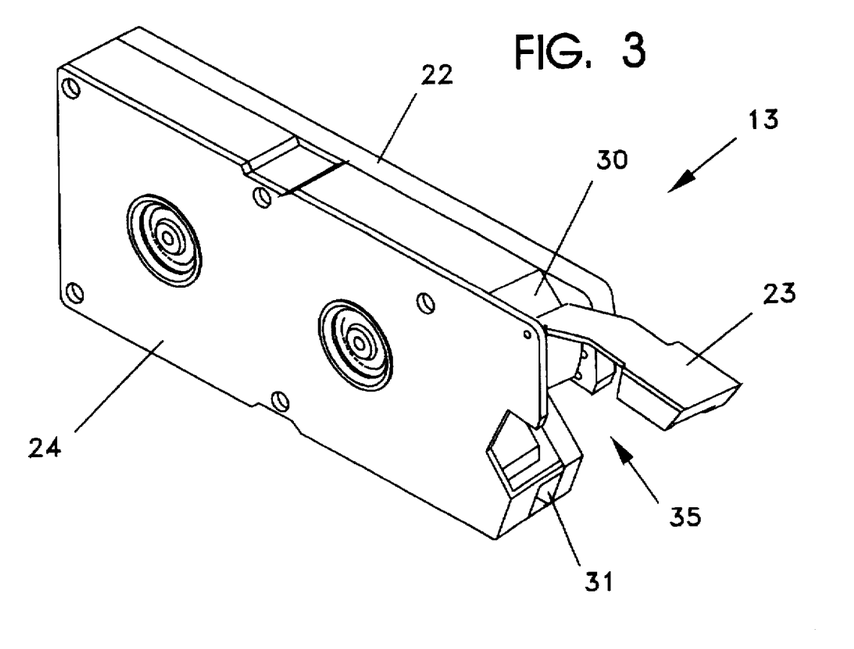
FIG. 3 is a perspective view of the magnetic tape cartridge having the pivoting door in an open position.

Referring to FIG. 3, the tape cartridge 13 is shown with the access door 23 pivoted to the open position, thereby exposing the inside of the tape cartridge 13 through a head opening represented by arrow 35. The tape is not shown in FIG. 3 to permit viewing a portion of a tape guiding path. When the access door 23 is pivoted to the open position, one or more tape heads (not shown) may be brought into contact with the tape to permit read and/or write access to data on the tape.

Figure 4:
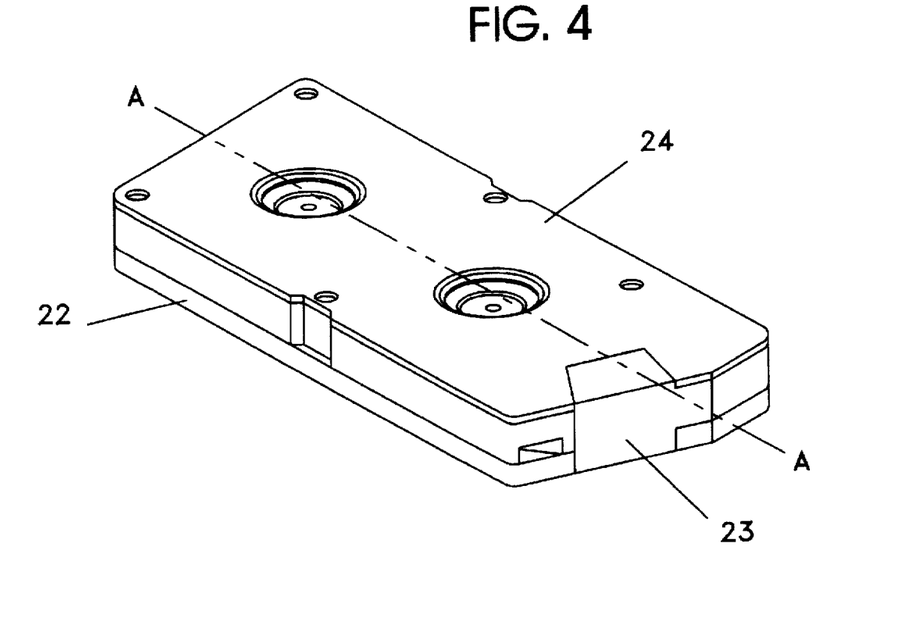
FIG. 4 is a perspective view of the magnetic tape cartridge showing a bottom edge thereof and having the pivoting door in a closed position.
Figure 5:
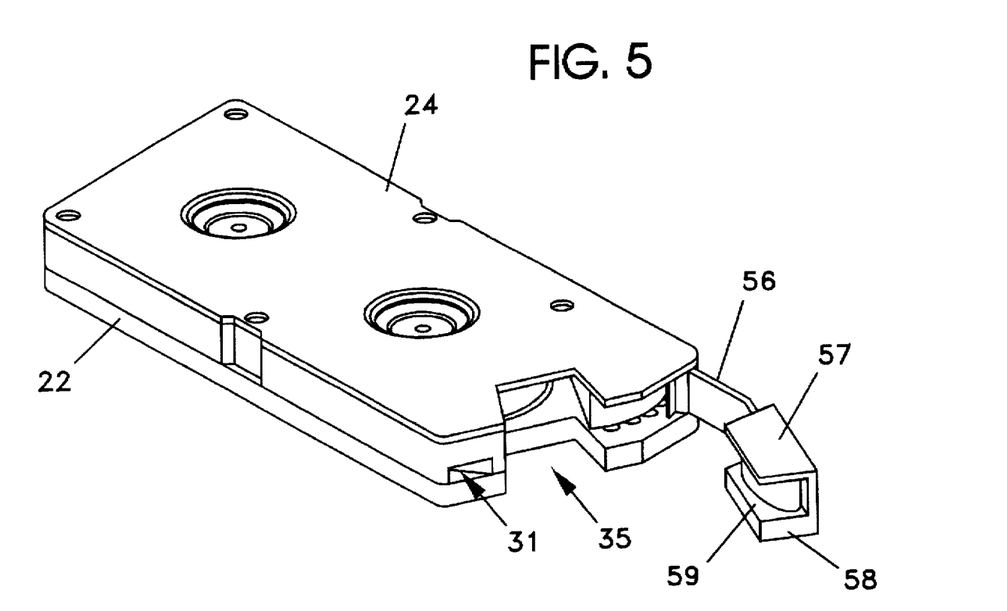
FIG. 5 is a perspective view of the magnetic tape cartridge showing a bottom edge and having the pivoting door in an open position for revealing a tape path therein.

In FIGS. 4 and 5 the tape cartridge 13 is shown from alternate perspectives. The position of the access door 23 in FIG. 5 reveals two door flanges 57 and 58 and a pseudo head 59. When the access door 23 is pivoted to the closed position, the tape is straddled by (i.e., travels in a tape path between) the upper flange 57 and the lower flange 58. Pseudo head 59 protrudes inward between flanges 57 and 58. When the access door 23 is pivoted to the closed position, pseudo head 59 takes the place of the tape head 15 in the tape path.

Figure 6:
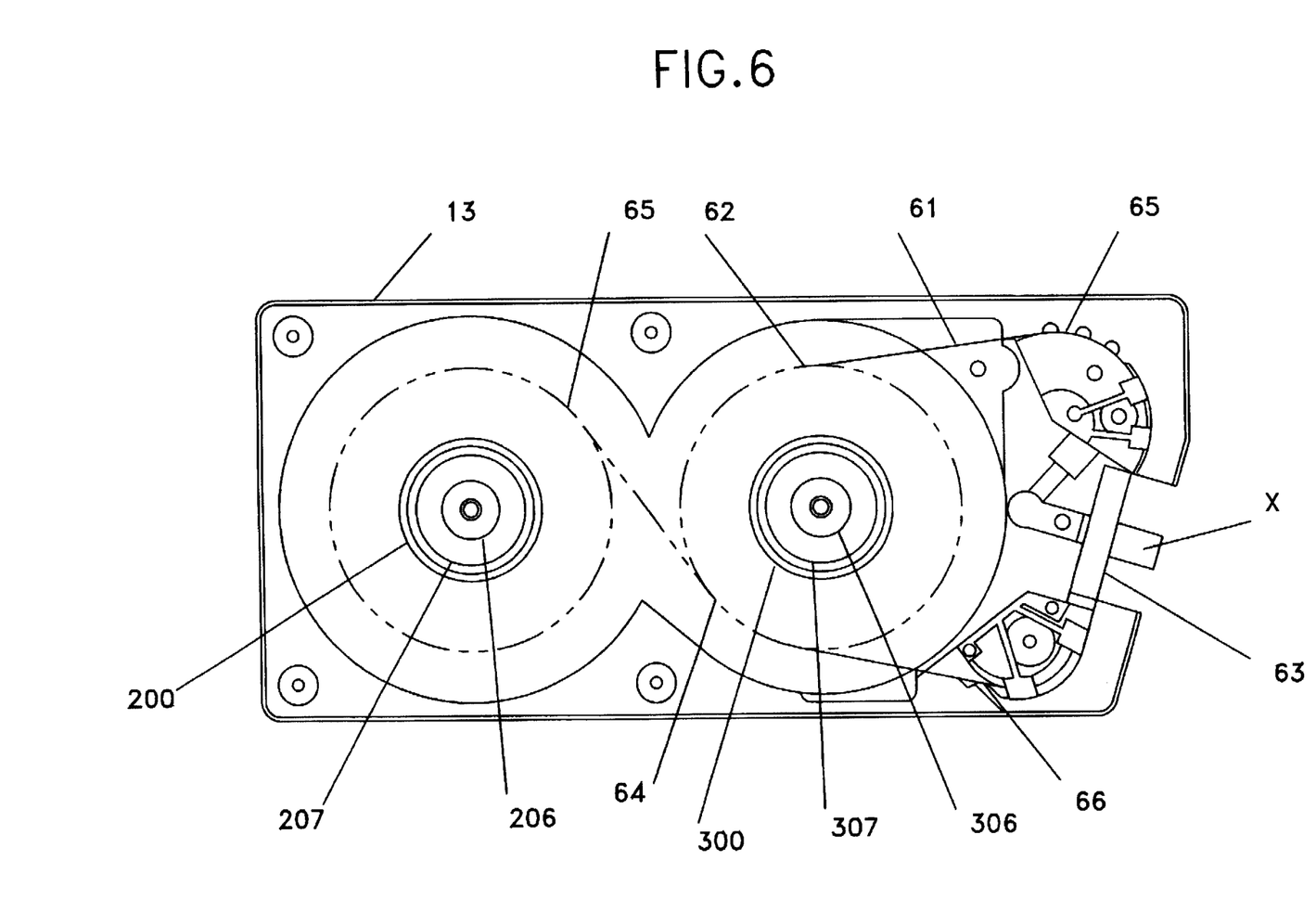
FIG. 6 is a perspective view of the magnetic tape cartridge having a cover removed for showing the internal features thereof.

FIG. 6 depicts the tape cartridge 13 with the cover 24 and the pivoting access door 23 removed. A tape 61 is shown wound on tape reels 200 and 300. The tape 61 may be wound from the tape reel 300 to the tape reel 200 and vise-versa. For the former, the tape 61 exits the tape reel 300 at a region 62, extends around a bearing 65, through a head region 63, forms a squeeze bearing 64 with tape still wound around the reel 300, and is spooled on to the tape reel 200 at region 65. The tape path is reversed when the tape 61 is wound from the tape reel 200 to the tape reel 300. The tape 61 is wound by the action of a motor (not shown) in the tape drive which drives a toothed hub 206, 306.

Still referring to FIG. 6, the tape head or pseudo-head, referenced generically by the letter X, is shown mated (i.e., in contact) with the tape 61 at head region 63. When the tape cartridge 13 is inserted into a tape drive (see FIG. 1) and seated in the tape cartridge mount therein, X is a tape head. Bearings 65 and 66 guide the tape 61 in the proximity of the tape head X while minimizing friction and wear. Such guiding permits the tape head to write data to, and read data from, the tape 61. When the tape cartridge 13 is not inserted into the tape drive, the access door 23 is closed and X is the pseudo-head. There is curvature (bowed into the tape cartridge 13) in the path of the tape 63 between bearings 65 and 66, as shown in FIG. 6. Both the tape head and the pseudo-head insert into the tape path 63 to prevent the tape from being drawn taut straight between the bearings 65 and 66.

Figure 7:
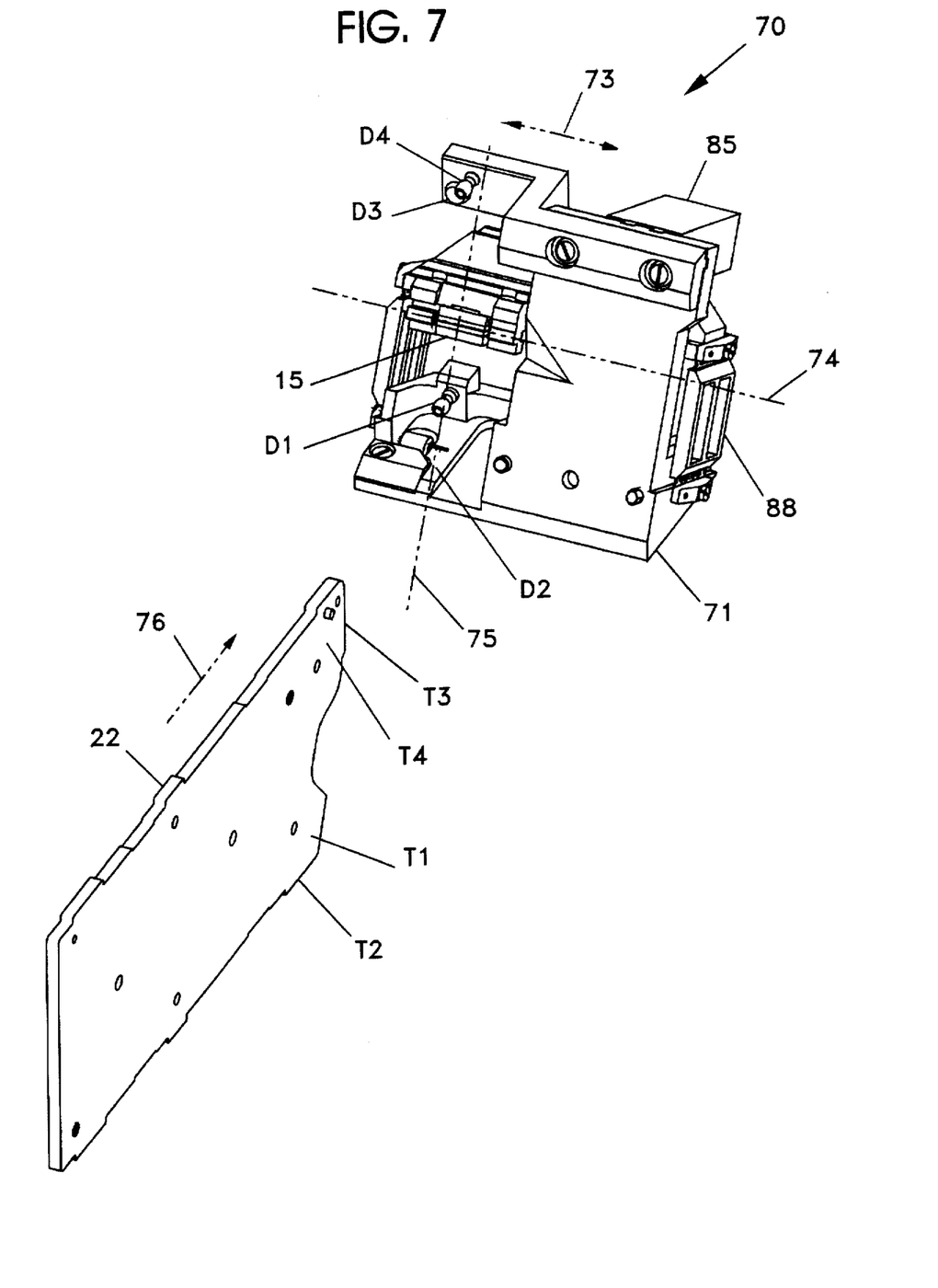
FIG. 7 is a perspective view of the head unit showing the several directions of force relative to the magnetic tape head.

FIG. 7 shows a field replaceable unit (FRU) or head unit 70 relative to the mount plate 22 of the tape cartridge 13. The head unit 70 advantageously provides for accurate alignment of the tape head 15 to the tape path (head-to-tape alignment) independently of the tape device. Historically, such head-to-tape alignments have been valid only for a particular set of head and tape guides and the realignment, in the tape device, had to be redone in the device if there was a separation of the head unit and the tape device. Hence, replacement costs are higher due to having to handle the tape device and gaining access to datum points internal to the drive in order to accomplish the alignment. Also, the tape head was not readily replaceable in the field, and when replaceable, substantial alignments by specially trained engineers and/or special tools were required.

The mount plate 22, as previously described, is accurately machined and the tape path, located within the tape cartridge 13, is accurately formed relative to the mount plate 22. Hence, certain tape data points located on the mount plate are used as the references for aligning the head to the tape path. Given that the head unit 70 is installed in the tape device in an accurate and repeatable manner, then the tape head 15 will be properly aligned to the tape path when a tape cartridge 13 is installed in the tape device according to the relationship between the mount plate 22 and datum located on the head unit 70.

The head unit 70 includes a base 71 which provides a support for the tape head 15 and other components as well as attachment and reference points for connecting to the tape device. There are four tape data points T1-T4 formed on the mount plate 22 which correspond to four head unit datums D1-D4, respectively, on the head unit 70. Datums D1 and D2 are fixed at predetermined positions relative to the tape head 15. Datum D2 contacts tape data point T2 when the tape cartridge 13 is inserted into the tape drive. The D2-T2 interface centers the tape cartridge in a direction indicated by imaginary line 75 (in one embodiment, the imaginary line 75 is angled back at twenty five degrees), and hence the tape path, relative to the tape head 15. The centering alignment is less critical than other alignments as can be understood by the tape head to tape relationship along line 75 (perpendicular to the read/write gaps of the tape head 15). Therefore, the datum D2 can be fabricated to a given tolerance, i.e., within less than a millimeter, such that datum D2 can be fixedly attached to the housing 71. In the preferred embodiment of the present invention, datum D2 is a roller type datum that acts to reduce cartridge-to-datum wear, and is constructed from nickel plated steel, for example. Alternatively, datum D2 can be a screw type datum for adjustably attaching to the base 71 for making a centering adjustment.

While datum D1 is also fixed to the housing 71 relative to the tape head 15, datum D1 is associated with a more critical azimuth alignment. The azimuth alignment is represented by the imaginary line 74 passing coincident to the read/write gaps of the tape head 15. Tape data point T1 contacts datum D1 upon proper insertion of the tape cartridge into the tape device wherein datum D1 provides a reference point for which the mount plate 22 rotates thereabout to make contact with the datum D4. Datum D4 is fixedly attached to azimuth arm 72. The azimuth arm 72 is slidably connected to a front of the base 71. Thus, the tape data points T1 and T4 contact datums D1 and D4, respectively, and the azimuth arm 74 is adjusted in the direction indicated by line 73 until the azimuth between the tape path (relative to the mount plate 22) and the tape head 15 is proper. Correct azimuth alignment, depending upon track widths, read/write gaps, etc., can require precision to within a few minutes of an arc. Therefore, such azimuth adjustment may require adjustment under a microscope or other precision alignment tools.

Penetration alignment of the tape cartridge 13 is determined by the relationship of tape data T3 and datum D3. Penetration direction is indicated by line 76. Datum D3 is adjusted by screwing datum D3 further into or back out of the azimuth arm 72. Penetration may also require submicron adjustments. Once the penetration alignment is made the datum D3 can be fixed into place, for example, by applying lock-tite thereto.

The head-to-tape alignment has been demonstrated to be featured in the head unit 70 alone and is not required to be associated with a particular tape device. Complete independence of the head unit 70 from the tape device is thus possible for tape-to-head alignment. Therefore, the head unit 70 can be sourced separately from the tape devices, and further, head units 70 may be interchanged from one tape device to another without further realignment.

Figure 8:
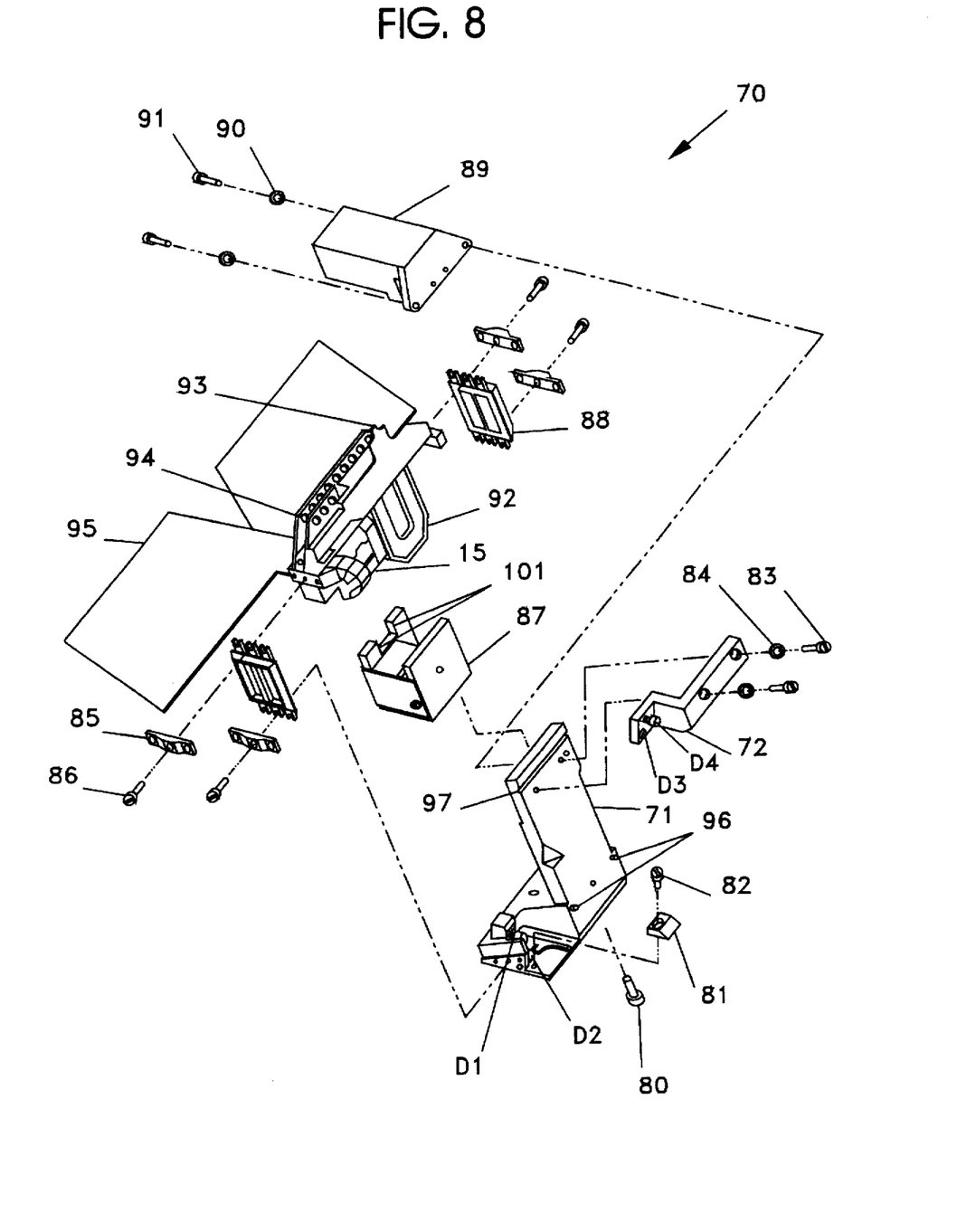
FIG. 8 is an exploded view showing the several parts of the head unit as they attach thereto according to a preferred embodiment of the present invention.
Figure 9:
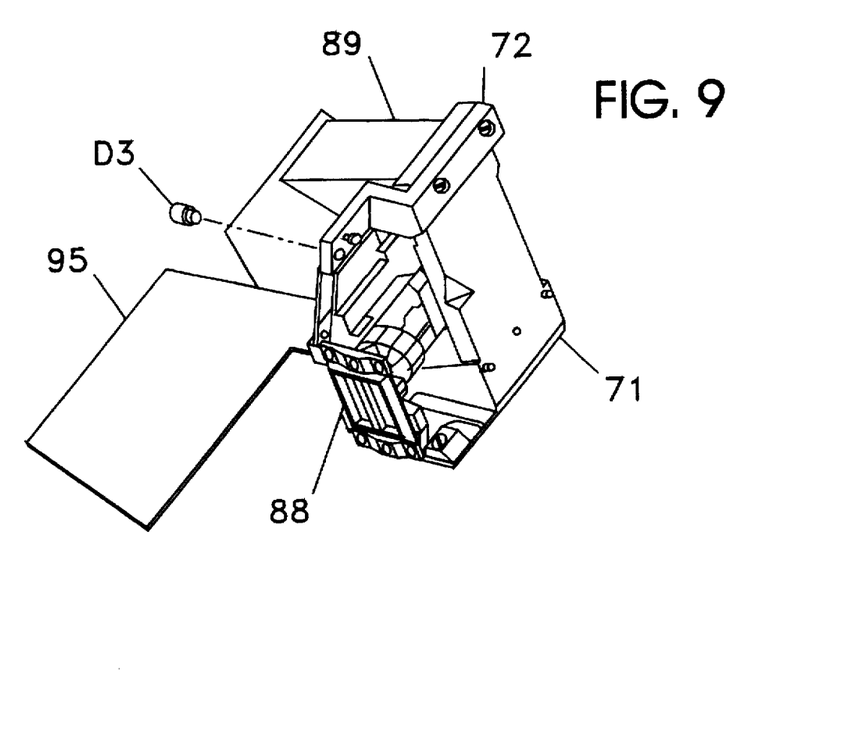
FIGS. 9 through 12 are perspective views of the head assembly according to a preferred embodiment of the present invention.
Figure 10:
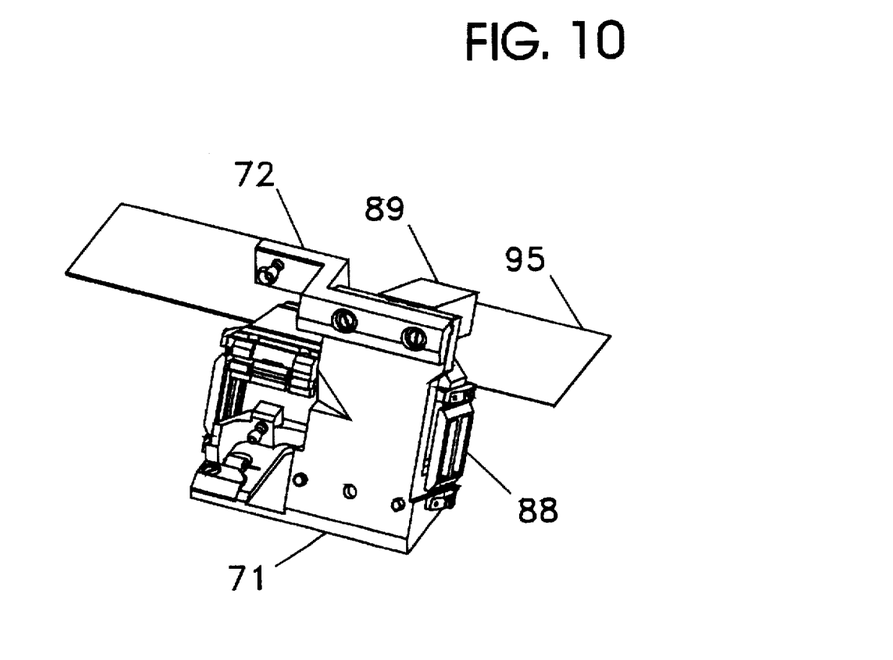
Figure 11:
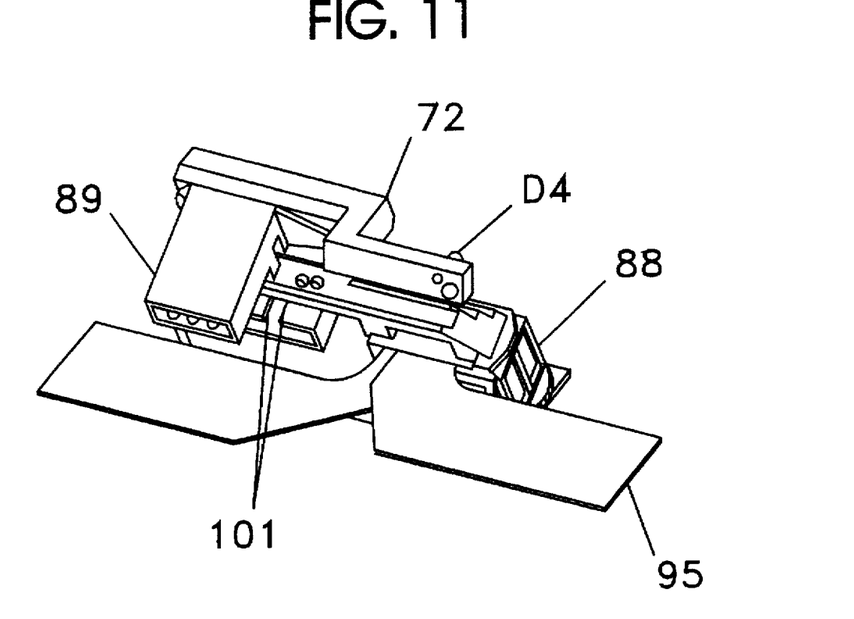
Figure 12:
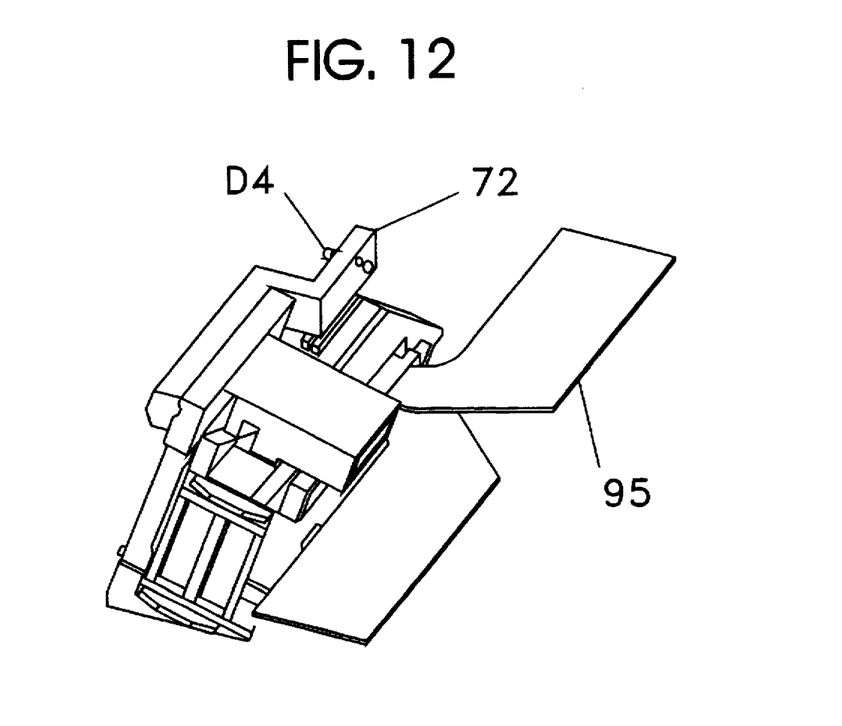

FIG. 8 depicts the head unit 70 in exploded view form for revealing details thereof. The base 71 is typically constructed from metal, for example, aluminum. The base 71 is attached to the tape device, in part, by a screw 80 and proper alignment thereto is provided by press fit pins 96. A datum lead-in 81, typically constructed of plastic, is attached to the base 71 via a screw 82. The datum lead-in helps guide the data cartridge 13 into alignment with the head unit 70 at tape data T2 while controlling wear and tear.

The azimuth arm 72 is slidably attached to the base 71 via screws 83 in conjunction with washers 84. The screws 83 pass through slotted holes in the azimuth arm 72 which allows for sufficient horizontal movement. A groove 97 is formed in the base 71 which cooperates with a tongue (not shown) in the azimuth arm 72 for maintaining strict vertical alignment. Datums D3 and D4 are attached to the azimuth arm 72 and are held in strict vertical position thereby while moveable in the horizontal direction for alignment. The base 71 and azimuth arm 72, along with the datums D1–D4 thereon, provide the necessary reference points and adjustability to accurately align the tape head 15 to the tape path. Of course the tape head 15 must be initially set to a predetermined position.

A magnet-housing-shield 87 is first attached to a back of the base 71 in a predetermined position. Next, a head assembly including the tape head 15, a voice coil 92, a head cable assembly 95, which are attached to a beam 94, including a sensor flag 93 geometry, is flexibly attached to the base 71. Flexures 88 are attached to the base 71 via clamps 85 and screws 86. The head assembly is also attached to the flexures 88 via other clamps 88 and screws 85 such that the voice coil 92 is located within magnets of the magnet, housing and shield 87. The vertical location of the tape head 15 can be made sufficiently close according to the design tolerances of the flexures 88 and clamps 85 (centering alignment).

An optical sensor 89 is vertically slidably attached to the back of the housing 71 but above the magnets, housing and shield 87, in a predetermined location as determined by pins and corresponding slots, for example. The head assembly is attached to the flexures 88 so that the flag 93 is located in a slot of the optical sensor 89. The tape head 15 is now movable in the horizontal direction under control of the voice coil 92 and magnets-housing-shield 87 for track following and indexing. The flag 93 in conjunction with the optical sensor 89 cooperate to find an accurate home position for the tape head 15 (affecting track registration). A maximum horizontal motion of the flag 93 and tape head 15 is constrained by crash stops 101. The position of the crash stops 101 is such that one or the other of the optical sensor 89 apertures is completely opened by the flag 89 at each of the crash stop positions.

The optical sensor 89, for example, is a two-channel optical sensor wherein each channel includes a light-emitting diode (LED) and phototransistor (PTX). Position sensing employs dual digital to analog converters (not shown) which also act for calibrating the channels of the optical sensor 89. The digital to analog converters control current sources that drive the LEDs for setting illumination levels which are in turn sensed by the PTXs. The electrical calibration of illumination is accomplished with the flag 93 positioned against the crash stop 101 used for this purpose. The crash stops 101 are fashioned such that the rigid beam 94 is positioned at points where the flag 93 completely uncovers on sensor aperture when the voice coil 92 is energized to drive the rigid beam 94 against one crash stop 101. The crash stops 101 also serve to limit total rigid beam 94 motion to protect against damage during shipment and during normal operation. An absolute reference position from which tape head 15 indexing occurs is not provided by the crash stops 101. After electrical calibration, the illumination is modulated by the flag 93 for indicating the position of the tape head 15. Corresponding output current from the PTXs is modulated in accordance with the tape head 15 position. The flag 93 is shaped such that as one sensor channel increases in illumination due to tape head 15 position, the other sensor channel decreases in illumination. The sensor output signals form a differential position signal that is linear as a function of position based upon the flag 93 bell like shape. The sensor signals can be separately converted to digital numbers and read by a processor to perform subtraction for deriving a position signal.

METHOD OF ASSEMBLY AND ALIGNMENT

Figure 13:
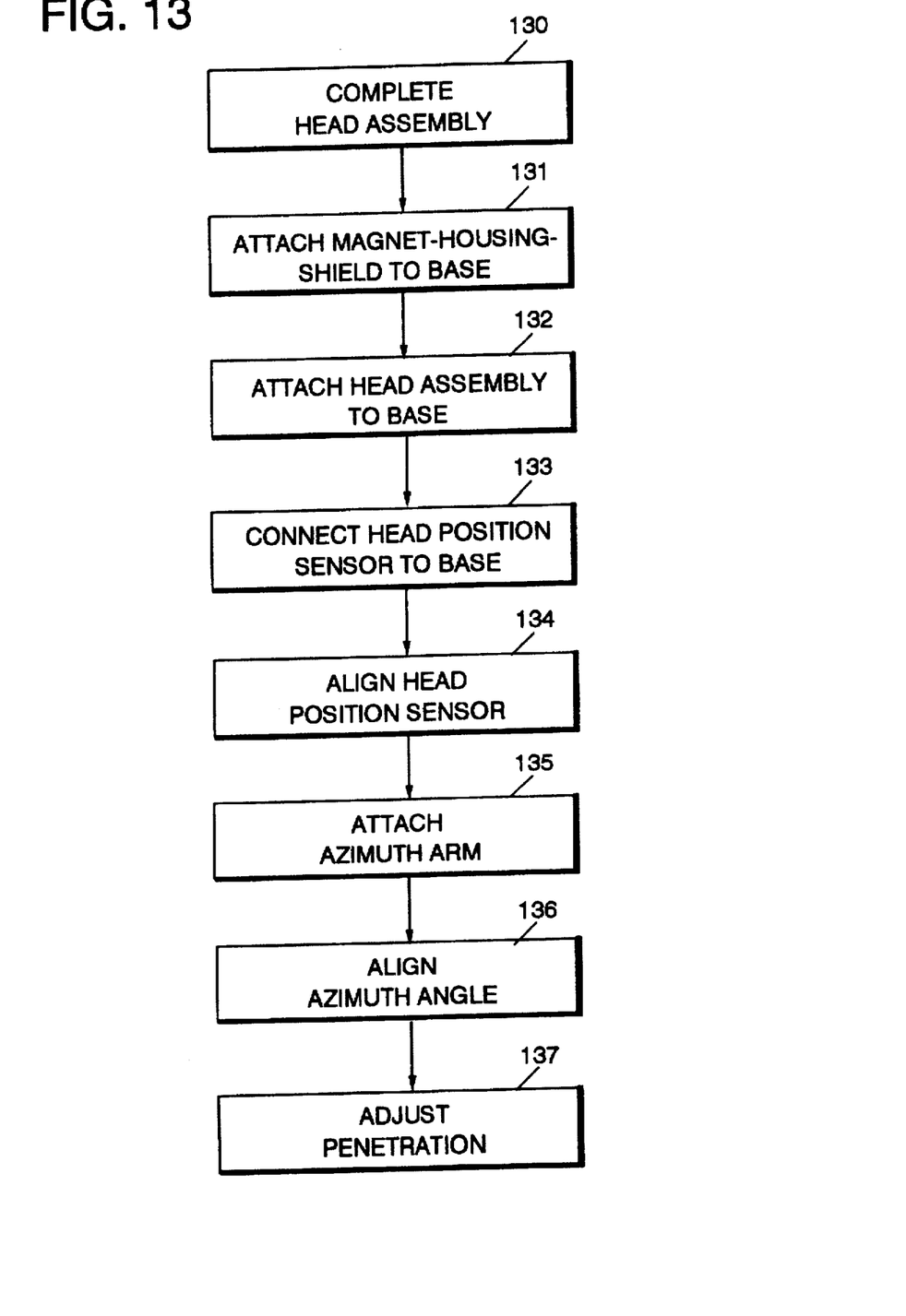
FIG. 13 is a flow diagram depicting a method of assembling and aligning the head unit according to a preferred embodiment of the present invention.

FIG. 13 is a flow diagram showing the method of assembling and aligning the tape head 13 to the tape path. The head assembly is prepared as a unit before attachment to the base 71. In the preferred embodiment the beam 94 is designed to minimize resonances associated with indexing the tape head 15 and the coil 92 is molded to the beam by an injection molding process known as over-molding. Hence, the beam 94 and the coil 92 form an integral unit. The flag 93, which has a bell type shape as described above, is also an integral part of the beam 94. Step 130 involves attaching the tape head 15 to the beam 94. The tape head 15, as is known in the art, may comprise two halves wherein each half includes aligned read and write elements. The head cables 95 are previously attached to the two head halves, for example, by thermo-compression bounding. The tape head 15 is then rigidly attached to the beam 94 by epoxy. Alternately, the tape head 15 can be clamped into the beam 94.

Before the head assembly can be attached to the base 71, at step 131 the magnet-housing-shield 87 is screwed or securely attached to the base 71 in a predetermined location according to a press fit pin and corresponding hole or other means. The coil 92 will be inserted into the magnet-housing-shield 87 when the head assembly is attached to the base 71. At step 132, the head assembly is attached to the base 71 by the flexures 88 which are secured by screws and clamps. The head assembly then, can be moved in a horizontal direction under control of a signal applied to the coil 92 in conjunction to the magnetic fields provided by the magnet-housing-shield 87. The shield provided around the magnets-housing-shield 87 protects the tape head 15 from unwanted magnetic flux lines. The head assembly is attached in a predetermined alignment relative to the base 71 by clamping the head assembly and base 71 in a assembly fixture (not shown) having precision ground surfaces then locking in the head assembly to base 71 alignment by attaching the flexures 88 and clamps 85. The assembly fixture is thus used to properly locate the head assembly to the base 71 within a predetermined tolerance. A first order wrap angle is achieved, typically at 10.43 degrees within a tolerance, for example, of 1.5 degrees. Further wrap angle adjustment is achieved by the penetration alignment step.

Step 133 involves attaching the optical sensor 89 to the base 71 such that the optical sensor straddles the flag 93. The optical sensor is attached such that vertical movement can be made for aligning the optical sensor 89 to the flag 93 for optimal relationship. At step 134 the optical sensor is aligned vertically relative to the flag 93. The optical sensor 89 LED illumination current is first electrically calibrated using the dual digital to analog converters at the crash stop 101 positions. By applying a signal to the voice coil, after electrical calibration, the head assembly, and hence the flag 93, can be precisely moved horizontally in order to center the flag between the dual sensors of the optical sensor 89 as indicated by the two PTXs having equal outputs. Next, the optical sensor is moved vertically while monitoring the differential output signal from the optical sensor 89. The optical sensor 89 is positioned properly when the differential output signal has a common-mode value corresponding to the design point for best linear performance. At this point, LED illumination current is electrically re-calibrated, and the vertical mechanical adjustment is repeated if necessary.

The azimuth arm 72 is loosely connected to the base 71 by aligning the tongue (not shown) at the back of the azimuth arm 72 to the groove in the front of the base 71. The azimuth arm 72 is then moved horizontally so that when the datum D4 contacts the tape data point T4 (or the equivalent of T4 as provided by a test fixture) the proper azimuth angle is achieved. Having made the azimuth adjustment, the azimuth arm is tightened into place. Step 137 includes adjusting datum D3, relative to the tape data point T3 (or the equivalent of T3 as provided by a test fixture) until the penetration is at the desired measurement. After completing the penetration adjustment, datum D3 is locked into place. The head unit is now aligned for tape head to tape path alignment. The head unit can be installed in any tape drive in an aligned relationship to the tape path by using press fit pins 96 in conjunction with corresponding holes in the tape device. Now, when a tape cartridge is inserted into the tape device, the mount plate 22 will be pushed against the datums D1-D4 and proper alignment is achieved.

While the invention has been particularly shown and described with reference to preferred embodiments thereof, it will be understood by those skilled in the art that various changes in form and details may be made therein without departing from the spirit and scope of the invention. For example, various changes may be made to certain materials as long as the critical requirements are met, for example, weight, strength, magnetic orientation, etc. Still further, means for attaching structures together may be changed without departing from the scope of the invention.

What is claimed is:

1. A method for assembling a field replaceable unit (FRU) including a tape head, the FRU being adjusted for tape head alignments to a tape path in a tape device, such adjustment being made during assembly and independent of said tape path, said adjustment made relative to a mount plate of a data cartridge, said mount plate having a plurality of tape data points, the tape head alignments including azimuth angle and penetration, said method comprising steps of:

(a) attaching securely, a magnet-housing-shield to a back side of a base;

(b) flexibly attaching a head assembly to the back of said base, the head assembly including a tape head attached to a rigid beam, a voice coil attached to said rigid beam, and a sensor flag, said head assembly mounted such that said voice coil is moveable between crash stops within said magnet-housing-shield;

(c) connecting securely, an optical sensor to the back of said base such that said flag is within a predetermined position of said optical sensor;

(d) attaching loosely, an azimuth arm to a front of said base, said azimuth arm having a fixed azimuth datum and an adjustable penetration datum attached thereto, said azimuth arm movable in a horizontal direction and fixed in a vertical direction;

(e) adjusting an azimuth angle of the tape head relative to the tape path by moving horizontally said azimuth arm such that said azimuth datum is in predetermined position relative to said tape head and securing said azimuth arm; and (f) adjusting said penetration datum by moving said penetration datum substantially perpendicular to said azimuth arm such that said mount plate and said penetration datum are in a predetermined relationship.

2. The method according to claim 1 wherein said head assembly is flexibly attached by first and second flexures clamped to first and second ends of said rigid beam.

3. The method according to claim 2 wherein said head assembly is flexibly attached to said base such that a wrap angle relationship between said tape head and said tape path is within a first order of tolerance.

4. The method according to claim 3 wherein said first order of tolerance is within one and one-half degrees of wrap angle.

5. The method according to claim 2 wherein said step (c) connecting securely said optical sensor further comprises connecting a signal to said voice coil for causing said flag to move horizontally within said optical sensor while monitoring a sensor voltage from said optical sensor for optimally positioning said optical sensor, relative to said flag.

6. The method according to claim 2 wherein said step (d) attaching loosely said azimuth arm further comprises inserting a horizonal tongue on a back of said azimuth arm into a groove on said base for preventing vertical movement of said azimuth arm relative to said base.

7. The method according to claim 2 wherein said head assembly further comprises:

(g) forming said voice coil on said rigid beam by overmolding said voice coil thereon;

(h) connecting said head cables to said tape head by thermo-compression bonding said head cables to said tape head; and (i) attaching said tape head to said rigid beam by epoxying said tape head to said rigid beam.

8. The method according to claim 2 further comprising a step (j) securely mounting a lead-in datum to the base for providing guidance to the tape cartridge into the FRU.

9. The method according to claim 8 further comprising:

(k) providing a signal to said voice coil for causing said flag to move to extreme horizontal positions; and (l) electrically calibrating dual light emitting diode/ phototransistor (LED/PTX) pairs in said optical sensor at each extreme horizontal position for a maximum (LED) illumination current for achieving a non-saturated, maximum voltage gain in each PTX.

* * * * *